United States Patent [19]

Cyr et al.

[11] 4,350,730
[45] Sep. 21, 1982

[54] PLASTIC LAMINATE

[75] Inventors: Stephen J. Cyr; John C. Schubert, both of Chippewa Falls, Wis.; John Dehlinger, Tenants Harbor, Me.

[73] Assignee: Standard Oil Company (Indiana), Chicago, Ill.

[21] Appl. No.: 311,930

[22] Filed: Oct. 16, 1981

[51] Int. Cl.³ .................... B32B 7/00; B32B 3/26; B32B 25/16
[52] U.S. Cl. .................... 428/215; 428/319.7; 428/519; 428/520
[58] Field of Search ............ 428/213, 215, 319.3, 428/319.7, 319.9, 519, 520; 156/78, 79

[56] References Cited
U.S. PATENT DOCUMENTS

| | | | |
|---|---|---|---|
| 3,463,687 | 8/1969 | Folsom et al. | 156/79 |
| 3,649,437 | 3/1972 | Wolinski et al. | 428/319.7 |
| 3,654,012 | 4/1972 | Schlager | 156/78 |
| 3,682,730 | 8/1972 | Haase | 428/319.7 |

Primary Examiner—William J. Van Balen
Attorney, Agent, or Firm—Robert R. Cochran; William T. McClain; William H. Magidson

[57] ABSTRACT

A laminate suitable for use as a graphic arts board comprising two solid ABS resin sheets, said ABS resin containing a pigment and UV stabilizer, said solid sheets being fushion bonded to the upper and lower surfaces of a foam resin core containing polystyrene or a blend of polystyrene and ABS resin, a nucleating agent, and an antistatic agent on the surfaces of the laminate.

4 Claims, No Drawings

PLASTIC LAMINATE

This invention relates to an all plastic laminate suitable for use as a graphic arts board. Such boards are widely used for exhibits, displays, point-of-sale materials, and other graphic media.

A number of graphic arts boards are now available, but these suffer from some deficiencies. Perhaps most widely used is corrugated paper board, but this is highly moisture absorbent, limiting its use. Newer boards now on the market are made with a polystyrene foam core with paper facing glued thereon. Again, the paper is moisture absorbent and, additionally, usually has an acid pH which is undesirable.

A desirable graphic arts board would be slightly translucent, moisture resistant, lightweight, strong, capable of being printed upon, die-cutable, scoreable, and thermoformable.

An object of this invention is to provide a graphic arts board having all of these desirable properties. It has a moisture absorption level less than 0.3 percent and weighs approximately 4 pounds for a 32 square foot panel. It is strong enough to support displays of heavy articles such as bowling balls. Both sides can be screened or printed using the flexographic process, offset and letterpress.

All plastic foam core laminates have been available for many years and a process for producing them is disclosed in Whelan et al. U.S. Pat. No. 3,616,020 (1971), which is incorporated herein by reference, because the board of the present invention is produced by that process. The Whelan et al. emphasizes using polystyrene as a foam core and as the solid sheets although copolymers of styrene are disclosed.

Broadly, the invention resides in a laminate suitable for use as a graphic arts board comprising two solid ABS resin sheets said ABS resin containing a pigment and UV stabilizer, said solid sheets being fusion bonded to the upper and lower surfaces of a foam resin core of polystyrene or a blend of polystyrene and ABS resin, a nucleating agent, and an antistatic agent on the surfaces of the laminate.

The use of an ABS (acrylonitrile-butadiene-styrene) resin provides the combination of properties desired in the cap sheet for printing and other applications of the graphic arts board. One suitable resin is DOW ABS 213 resin, this resin having a Vicat softening point of 215° F. (D-1525), a specific gravity of 1.05 grams per cubic centimeter (D-792), and a melt flow rate of 5.5 (D-1238, condition 1, grams per 10 minutes). It is understood that this resin contains an oxidation and thermal degradation inhibitor which is octadecyl 3,5-di-tert-butyl-4-hydroxyhydrocinnamate. Other ABS resins can be used.

Added to the resin is a pigment to give the desired color, suitable pigments including titanium dioxide, zinc oxide, calcium carbonate, and the like. Such pigments are used in the amount of 1 to 5, preferably 1.5 to 2.5, weight percent based on the cap sheet composition. These can be obtained as a masterbatch of the pigment in ABS resin. An example of this is Ferro Corporation CY-8061 which contains 51.95 percent $TiO_2$, 0.61 percent pigment toners, and 47.44 percent ABS resin.

An additional ingredient required in the resin sheet is a UV stabilizer system, again available in a masterbatch with ABS resin. One system found to be particularly suitable includes a blend of approximately equal parts of two Ciba-Geigy stabilizers Tinuvin P which is 2(2'-hydroxy-5'-methylphenyl) benzotriazole and Tinuvin 770 which is a hindered amine. Such a combination is available from Ferro Corporation as AY-8070 which contains 3.75 percent Tinuvin P, 3.50 percent Tinuvin 770, and 92.75 percent ABS resin. The combination can be used in amounts of 0.05 to 3, preferably 0.1 to 1, weight percent of the additives based on the cap sheet composition.

The ABS resin sheets are fusion bonded to a foam resin core according to the process of Whelan et al. U.S. Pat. No. 3,616,020. Obviously, the laminate can be made in any desired thickness, but generally the foam core is 50 to 500 mils thick and has a density of 1.5 to 6, preferably 2.5 to 4, pounds per cubic foot. The ABS resin cap sheet is 2 to 10 mils thick. General purpose polystyrene can be used for the foam, but the more usual situation involves adding recycled scrap containing the ABS resin to the foam resin supply. Such recycle material results from resin scrap produced in start-up, edge trim, and the like. Thus, recycle scrap can be used in amounts to provide up to 30 weight percent ABS resin in the foam composition. As is normal, a nucleating agent is used in the foam production; suitable nucleating agents include talc and mixtures of sodium bicarbonate and citric acid. The amount of nucleating agent is generally in the range of 0.1 to 1 weight percent based upon the foam resin.

Finally, for satisfactory production, it is necessary to have an antistatic agent on the surfaces of the laminate in order to reduce the buildup of static electricity. While many antistatic agents are known, one we have found particularly suitable is marketed under the trademark Staticide by Analytical Chemical Laboratories. As active ingredients, this product contains n-alkyl (60 percent $C_{14}$, 30 percent $C_{16}$, 5 percent $C_{12}$, 5 percent $C_{18}$) dimethyl benzyl ammonium chlorides and n-alkyl (68 percent $C_{12}$, 32 percent $C_{14}$) dimethyl ethylbenzyl ammonium chlorides. This material is received in a concentrate containing approximately 0.26 percent active ingredient. In our work, this concentrate was diluted 100 to 1 with water and used in the range of a 0.05 to 0.25 gallon per 1000 square feet of product. It is preferably applied by spraying on to both sides of the sheet, and a range of 0.1 to 0.2 gallon per 1000 square feet is preferred. Alternatively an internal antistatic agent can be added to the ABS resin which will bloom to the surface of the laminate in a matter of hours, preferably within two hours.

A "cigarette ash" test is used to determine the amount of antistatic agent to be used. For this test, a panel of the laminate is rubbed with a piece of cloth, then positioned very close to but not touching cigarette ashes, and examined to see if any ashes have been picked up. The material is satisfactory if no ashes adhere to the laminate. The amount of antistatic agent applied is adjusted after testing a board.

The following example sets forth preferred embodiments of the invention, but should not be considered as unduly limiting. Foam board is generally produced in thickness of 3/16, 1/8, and 1/16 inch thickness. Component weights for each ingredient in the final product are shown in the following table:

| COMPONENT: | Weight % Board Size | | |
|---|---|---|---|
| | 3/16" | ⅛" | 1/16" |
| Amoco R2 polystyrene | 42.1 | 37.4 | 32.4 |

-continued

| COMPONENT: | Weight % Board Size | | |
|---|---|---|---|
| | 3/16" | ⅛" | 1/16" |
| DOW 213 ABS resin | 50.8 | 55.1 | 59.7 |
| Normal Butane | 2.4 | 2.1 | 1.8 |
| Talc | .3 | .3 | .2 |
| White Concentrate | 3.2 | 3.7 | 4.3 |
| UV Inhibitor | 1.2 | 1.4 | 1.6 |
| Antistatic agent | NEGLIGIBLE | | |
| TOTAL | 100 | 100 | 100 |

In the above tabulation, the weights are based upon a foam containing 25 percent ABS resin. The blowing agent, normal butane, is added at a rate of approximately 4 percent of the foam weight, but, over a time, approximately one-half of the butane disappears. The talc was added at about 0.5 weight percent of the foam weight. The talc was Mistron ZSC, a product of Cyprus Industrial Minerals Company which gives a mineral analysis of 98 percent talc, 2 percent dolomite and 1 percent quartz, all on a weight basis. The white concentrate ($TiO_2$) was added to be 8 percent of the coating resin, this providing 4.16 grams per 100 grams of the cap sheet composition. The UV inhibitor was a masterbatch of ABS and the Tinuvin 770 and Tinuvin P previously described. Approximately 3 weight percent of the concentrate was used, this providing 0.112 grams of Tinuvin P and 0.105 grams of Tinuvin 770 per 100 grams of the cap sheet. The antistatic agent was applied to both coatings of the sheet. Upon evaporation of the water its weight is not measurable.

While we have described certain specific embodiments of the invention, it will be apparent that considerable variation and modification of these specific embodiments can be made without departing from the scope of the invention. While specific additives have been recited, those skilled in the art will recognize that alternatives are available and a simple experiment will show the suitability of such additives.

We claim:

1. A laminate suitable for use as a graphic arts board comprising two solid ABS resin sheets, said ABS resin comprising a pigment and UV stabilizer, said solid sheets being fusion bonded to the upper and lower surfaces of a foam resin core containing a blend of polystyrene and ABS resin, a nucleating agent, and an antistatic agent on the surfaces of the laminate.

2. The laminate of claim 1 wherein said antistatic agent is a mixture of n-alkyl (60 percent $C_{14}$, 30 percent $C_{16}$, 5 percent $C_{12}$, 5 percent $C_{18}$) dimethyl benzyl ammonium chlorides and n-alkyl (68 percent $C_{12}$, 32 percent $C_{14}$) dimethyl ethylbenzyl ammonium chlorides.

3. A laminate suitable for use as a graphic arts board comprising two solid ABS resin sheets each 2 to 10 mils thick, said ABS resin, comprising 1 to 5 weight percent of pigment, 0.05 to 3 weight percent of a UV stabilizer, said solid sheets being fusion bonded to the upper and lower surfaces of a foam resin core, said foam resin core being 50 to 500 mils thick and having a density of 1.5 to 6 pounds per cubic foot containing 100 to 70 weight percent general purpose polystyrene and 0 to 30 weight percent ABS resin, and, based on the total foam resin core, 0.1 to 1 weight percent talc, and an antistatic agent on the surfaces of the laminate.

4. The laminate of claim 3 wherein said ABS resin sheets are 3 to 5 mils thick, said pigment is $TiO_2$ in an amount of 3 to 5 weight percent and said UV stabilizer is a mixture of 2(2'hydroxy-5-methylphenyl) benzotriazole and a hindered amine.

* * * * *